United States Patent
Du et al.

(10) Patent No.: US 7,212,658 B2
(45) Date of Patent: May 1, 2007

(54) SYSTEM FOR FINGERPRINT IMAGE RECONSTRUCTION BASED ON MOTION ESTIMATE ACROSS A NARROW FINGERPRINT SENSOR

(75) Inventors: Robert Weixiu Du, Danville, CA (US); Chinping Yang, Cupertino, CA (US); Chon In Kou, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/927,599

(22) Filed: Aug. 25, 2004

(65) Prior Publication Data

US 2005/0238212 A1    Oct. 27, 2005

Related U.S. Application Data

(60) Provisional application No. 60/564,875, filed on Apr. 23, 2004, provisional application No. 60/565,256, filed on Apr. 23, 2004.

(51) Int. Cl.
G06K 9/00        (2006.01)
(52) U.S. Cl. ...................................... 382/124; 382/115
(58) Field of Classification Search ........ 382/124–126, 382/209, 278, 115; 702/19
See application file for complete search history.

(56) References Cited

U.S. PATENT DOCUMENTS

| | | | | |
|---|---|---|---|---|
| 4,827,527 A | * | 5/1989 | Morita et al. ............... | 382/127 |
| 5,799,098 A | * | 8/1998 | Ort et al. .................... | 382/125 |
| 6,259,805 B1 | * | 7/2001 | Freedman et al. .......... | 382/124 |
| 6,529,617 B1 | * | 3/2003 | Prokoski ..................... | 382/128 |
| 6,567,765 B1 | * | 5/2003 | Wu et al. .................... | 702/182 |
| 6,681,034 B1 | * | 1/2004 | Russo ......................... | 382/125 |
| 2001/0016055 A1 | * | 8/2001 | Harkless et al. ............. | 382/115 |
| 2003/0002718 A1 | | 1/2003 | Hamid | |
| 2003/0123714 A1 | | 7/2003 | O'Gorman et al. | |
| 2003/0126448 A1 | | 7/2003 | Russo | |
| 2003/0202687 A1 | * | 10/2003 | Hamid et al. ............... | 382/124 |
| 2004/0005087 A1 | | 1/2004 | Hillhouse | |
| 2005/0018925 A1 | * | 1/2005 | Bhagavatula et al. ....... | 382/278 |

OTHER PUBLICATIONS

Zhang et al., "Core-Based structure Matching Algorithm of Fingerprint Verification," 2002, IEEE, pp. 70-74.*

(Continued)

*Primary Examiner*—Matthew C. Bella
*Assistant Examiner*—Shefali Patel
(74) *Attorney, Agent, or Firm*—Michael C. Stephens, Jr.; Trellis Intellectual Property Law Group, PC

(57) ABSTRACT

In accordance with an embodiment of the present invention, an efficient and accurate system and method are described for detecting a fingerprint from swipe sensor system. A swipe sensor module is coupled to a microprocessor module. The swipe sensor module collects fingerprint image data as a plurality of frames and passes the frames of data to the microprocessor module. The microprocessor module assembles the frames of data into a complete image of the fingerprint that is cropped and processed to remove noise and artifacts. The cropped image is used to generate a template in a first instance and to compare an extracted portion of the cropped image to existing templates in a second instance.

25 Claims, 11 Drawing Sheets

OTHER PUBLICATIONS

Ugur Halici, "Fingerprint Classification Through Self-Organizing Feature Maps Modified to Treat Uncertainties," IEEE, 10, Oct. 1996, pp. 1497-1512.*

Qinzhi Zhang, Kai Huang, and Hong Yan; Fingerprint Classification Based on Extraction and Analysis of Singularities and Pseudoridges; Pan-Sydney Area Workshop on Visual Information Processing; © 2002; 5 pages; vol. 11; Sydney, Australia.

Robert Du and Chinping Yang; Fingerprint Verification Via Correlation Filters- A Rotational Sensitivity Study; Sony Technical Symposium; pp. 1-6.

* cited by examiner

SYSTEM FOR FINGERPRINT IMAGE RECONSTRUCTION BASED ON MOTION ESTIMATE ACROSS A NARROW FINGERPRINT SENSOR

CROSS REFERENCE TO RELATED APPLICATIONS

This application claims priority from provisional U.S. Patent Application No. 60/565,256 entitled "FINGERPRINT IDENTIFICATION SYSTEM USING A SWIPE FINGERPRINT SENSOR" filed 23 Apr. 2004 and from provisional U.S. Patent Application No. 60/564,875 entitled "FINGERPRINT IMAGE RECONSTRUCTED BASED ON MOTION ESTIMATE ACROSS A NARROW FRINGERPRINT SENSOR" filed 23 Apr. 2004, both of which are incorporated by reference.

This application is also related to the following and commonly assigned patent application, which is incorporated by reference herein: application Ser. No. 10/927,178, entitled "FINGERPRINT IMAGE RECONSTRUCTION BASED ON MOTION ESTIMATE ACROSS A NARROW FRINGERPRINT SENSOR," filed on same date herewith, by Robert Weixiu Du, Chinping Yang, Chon In Kou and Shuang Li.

BACKGROUND OF THE INVENTION

1. Field of the Invention

The present invention relates to personal identification using biometrics and, more specifically, to a method for reconstructing a fingerprint image from a plurality of image frames captured using a swipe fingerprint sensor.

2. Related Art

Identification of individuals is an important issue for, e.g., law enforcement and security purposes, for area or device access control, and for identity fraud prevention. Biometric authentication, which is the science of verifying a person's identity based on personal characteristics (e.g., voice patterns, facial characteristics, fingerprints) has become an important tool for identifying individuals. Fingerprint authentication is often used for identification because of the relative ease, non-intrusiveness, and general public acceptance in acquiring fingerprints.

To address the need for rapid identification, fingerprint recognition systems have been developed that use electronic sensors to measure fingerprint ridges with a capacitive image capture system. One type of system captures the fingerprint as a single image. To use such sensors, an individual places a finger (any of the five manual digits) on the sensor element and holds the finger motionless until the system captures a good quality fingerprint image. But the cost of the capacitive fingerprint sensor is proportional to the sensor element area so there is a compelling need to minimize the sensor element area while at the same time ensuring that no relevant portion of the fingerprint is omitted during image capture. Further, large sensors require substantial area to install and are impracticable for many portable applications such as to verify the owner of portable electronic devices such as personal digital assistants or cellular telephones.

One way of reducing sensor size and cost is to rapidly sample data from a small area capacitive sensor element as a finger is moved (or "swiped") over the sensor element. In these "swipe" sensors, the small area sensor element is generally wider but shorter than the fingerprint being imaged. Sampling generates a number of image frames as a finger is swiped over the sensor element, each frame being an image of a fraction of the fingerprint. The swipe sensor system then reconstructs the image frames into a complete fingerprint image.

While swipe fingerprint sensors are relatively inexpensive and are readily installed on most portable electronic devices, the amount of computation required to reconstruct the fingerprint image is much greater than the computation required to process a fingerprint captured as a single image. Swipe sensor computation requirements increase system costs and result in poor identification response time. Computational requirements are further increased because of variations in a digit's swipe speed and the need to accommodate various finger positions during the swipe as the system reconstructs a complete fingerprint image from the frames generated during the swipe. The sensor system must determine the finger's swipe speed so as to extract only the new portion of each succeeding frame as the system reconstructs the fingerprint image. Thus, for effective use for identification, current swipe sensors must be coupled to a robust computing system that is able to reconstruct the fingerprint image from the image frames in real or near-real time.

Another major drawback to the use of fingerprints for identification purposes arises from the difficulty in associating the captured image with a particular individual, especially in portable applications. The output of the sensor is typically compared to a library of known fingerprints using pattern recognition techniques. It is generally recognized that the core area of a fingerprint is the most reliable for identification purposes. With the image acquired by a large area sensor, the core area is consistently located in the general center of the image. With a swipe sensor, however, it is difficult to locate this core area. Unlike the image generated by a large area fingerprint sensor, the core location of the image reconstructed by a swipe sensor cannot be guaranteed to be located in the neighborhood of the image center due to the way a digit may be positioned as it is swiped over the sensor element.

For this reason, the use of fingerprint verification has been limited to stationary applications requiring a high degree of security and widespread adoption of fingerprint identification has been limited. What is needed is a fingerprint identification system that is inexpensive, that efficiently assembles swipe sensor frames into a fingerprint image, that locates the core area of the reconstructed fingerprint image, that authenticates the captured fingerprint image in real or near-real time, and that performs these tasks using the limited computing resources of portable electronic devices.

SUMMARY OF EMBODIMENTS OF THE INVENTION

In accordance with an embodiment of the present invention, a low cost fingerprint identification system and method is provided. More specifically, the present invention relates to reconstructing a fingerprint image from a plurality of frames of image data, obtained from a swipe sensor fingerprint identification system. Each frame comprises a plurality of lines with each line comprising a plurality of pixels.

The frames are transferred to a host where the fingerprint image is reconstructed. After a first frame $F_1$ is stored in a reconstructed image matrix (denoted I), the new data portion of each subsequent frame is stored in the image matrix until a complete image of the fingerprint is obtained.

The fingerprint image reconstruction process of the present invention determines how many lines in each frame is new data. This determination is based on a motion estimate that is obtained for each frame after the first frame. To reduce computational overhead, the motion estimate process initially decimates each frame by reducing the number of pixels in each row. Decimation reduces subsequent computational requirements without reducing resolution in motion estimation and enables real-time processing even if system resources are limited. The decimated frame is then normalized and a correlation process determines the amount of overlap between consecutive frames. The correlation process generates a delay factor that indicates how many new lines have moved into each frame relative to the immediately preceding frame. The correlation process continues until there are no further frames to add to the reconstructed matrix.

The present invention further provides an enrollment mode and an identification mode. The enrollment mode is used to build a database of templates that represent authorized or known individuals. In the identification mode, a fingerprint image is processed and compared to templates in the database. If a match is found, the user is authenticated. If no match is found, that condition is noted and the user is provided the opportunity to enroll. A user interface is used to assist the user in use of the system.

Because the fingerprint image is reconstructed from a plurality of frames of data, and because of the potential for poor image quality arising from improper orientation, improper speed of a swipe or for other reasons, the present invention includes an image quality check to make sure that the image contains adequate information to arrive at a user identification. Further, to minimize computational resources, the present invention further crops the reconstructed frame, removes noise components and then extracts a small, core portion of the fingerprint. The core portion of the fingerprint image is used to generate a template for the database when the system is operating in the enrollment mode. When the system is operating in the identification mode, the core portion is compared to the template to determine if there is a match.

Advantageously, the reconstructed method efficiently converts the frames of a finger scan into an accurate image of the fingerprint. Then, once the image is obtained, the enrollment and identification modes are well suited for implementation in portable electronic devices such as cellular telephones, PDAs, portable computers or other electronic devices. These and other features as well as advantages that categorize the present invention will be apparent from a reading of the following detailed description and review of the associated drawings.

DETAILED DESCRIPTION OF EMBODIMENTS OF THE INVENTION

Figure 1:
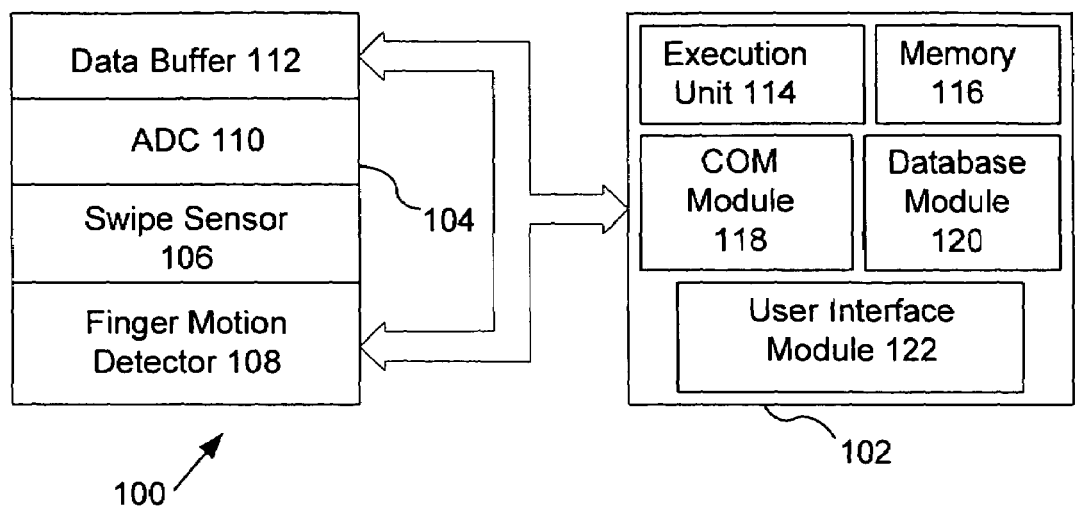
FIG. 1 a simplified block diagram illustrating one exemplary embodiment of a fingerprint identification system in accordance with an embodiment of the present invention.

Referring now to the drawings more particularly by reference numbers, an exemplary embodiment of a fingerprint identification system 100 is illustrated in FIG. 1. System 100 includes a microprocessor module 102 and a fingerprint sensor module 104 that operates under the control of microprocessor 102.

Fingerprint sensor module 104 includes a swipe sensor 106, which includes a swipe sensor stripe 200 (FIG. 2), over which a finger is moved, and associated electronic circuits. In some embodiments, the sensor stripe area of swipe sensor 106 is much smaller than the surface area of a typical fingerprint so that, as the finger is moved ("swiped") across the sensor stripe, partial fingerprint images are acquired sequentially in time. Fingerprint sensor module 104 also includes finger motion detector 108, analog to digital converter (ADC) 110, and data buffer 112 that receives data from swipe sensor 106 and motion detector 108. Data buffer 112 is illustrative of various single and multiple buffer (e.g., "double-buffering") configurations.

Microprocessor module 102 includes an execution unit 114, such as a PENTIUM brand microprocessor commercially available from INTEL CORPORATION. Microprocessor module 102 also includes memory 116. In some embodiments memory 116 is a random access memory (RAM). In some embodiments, memory 116 is a combination of volatile (e.g., static or dynamic RAM) and non-volatile (e.g., ROM or Flash EEPROM). Communication module 118 provides the interface between sensor module 104 and microprocessor module 102. In some instances, communication module 118 is a peripheral interface module such as a universal serial bus (USB), an RS-232 serial port, or any other bus, whether serial or parallel, that accepts data from a peripheral. In instances in which a dedicated microprocessor module 102 is implemented on a single semiconductor substrate together with sensor module 104, communication module 118 functions as, e.g., a bus arbiter. Database module 120 manages one or more fingerprint image templates stored (e.g., in memory 116) for use during identification of a particular individual. A user interface (UI) module 122 enables system 100 to communicate with a user using various ways known in the electronic arts. In some embodiments, UI module 122 includes an output, such as a video display or light emitting diodes, and/or an input, such as a keypad, a keyboard, or a mouse. Thus, in some instances system 100 prompts a user to place a finger on swipe sensor 106's sensor stripe and to swipe the finger in a specified direction. If the swipe results in an error, system 100 instructs the user to repeat the swipe. In some instances, system 100 instructs the user how to move the finger across the sensor by displaying, e.g., a video clip.

If motion detector 108 detects the presence of a finger about to be swiped, motion detector 108 transmits an interrupt signal to microprocessor module 102 (e.g., an interrupt signal that execution unit 114 detects). In response to the received interrupt signal, execution unit 114 accesses executable code stored in memory 116 and the two-way communication between sensor unit 104 and microprocessor module 102 is established.

As a finger is swiped over the sensor stripe, swipe sensor 106 generates an analog signal that carries the partial fingerprint image data frames for a fingerprint image. ADC 110 receives and converts the analog signal from swipe sensor 106 into a digital signal that is directed to data buffer 112. Data buffer 112 stores data associated with one or more of the captured fingerprint image data frames received from ADC 110. Image data from data buffer 112 is then transferred to microprocessor module 102, which performs signal processing functions in real or near-real time to reconstruct and identify the complete fingerprint image. In some embodiments, the image frame data in data buffer 112 is transferred to microprocessor module 102 in small chunks (e.g., one pixel row at a time, as described in more detail below) to reduce the amount of memory required in sensor module 104.

If motion detector 108 indicates to microprocessor module 102 that the finger swipe is complete, execution unit 114 initiates the transfer of data from buffer 112 to memory 116. Alternately, data from swipe sensor 106 begins to be transferred to execution unit 114 if the beginning of a finger swipe is detected. Execution unit 114 stops receiving data generated by swipe sensor 106 if the swipe is completed, if no finger is present, if finger motion over swipe sensor 106 stops, or if the swipe duration exceeds a maximally allowed time specified by the system (i.e., a system timeout feature).

As a power saving feature, in some embodiments sensor module 104 remains in a quiescent state until motion detector 108 detects motion. When motion detector 108 detects a finger being moved it triggers sensor module 104 into full power operation. At substantially the same time, the motion detection activates a communication link with microprocessor module 102. Once activated, partial fingerprint image frame data in data buffer 112 is transferred to microprocessor module 102, which performs signal-processing functions to reconstruct the fingerprint image, as described in detail below There are two system 100 operating modes. The first operating mode is the enrollment mode, in which an individual is enrolled in identification system 100. When the enrollment mode is selected, several of the individual's fingerprint images are captured, together with other identifying information such as the individual's name, physical description, address, and photograph. Each fingerprint image captured by sensor module 104 is verified and processed by microprocessor module 102 to generate a template of the individual's fingerprint. The template is stored (e.g., under control of database module 120) for later use during identification when system 100 is operating in the second mode.

The second system 100 operating mode is the identification mode, in which system 100 determines if an individual is identified. When the identification mode is selected, sensor module 104 acquires a fingerprint image that is processed by microprocessor module 102. If the acquired image meets one or more predetermined criteria, it is compared to the library of stored fingerprint image templates. If there is a match between the acquired image and a stored image template, then the individual has been successfully identified. The results of the comparison may then be further acted upon by microprocessor module 102 or by a second electronic device or system. By way of example, if microprocessor module 102 is coupled to an electronic door lock, and an individual with previous authorization desires to open the door, microprocessor module 102 controls the electronic door lock to unlock the door.

Figure 2:
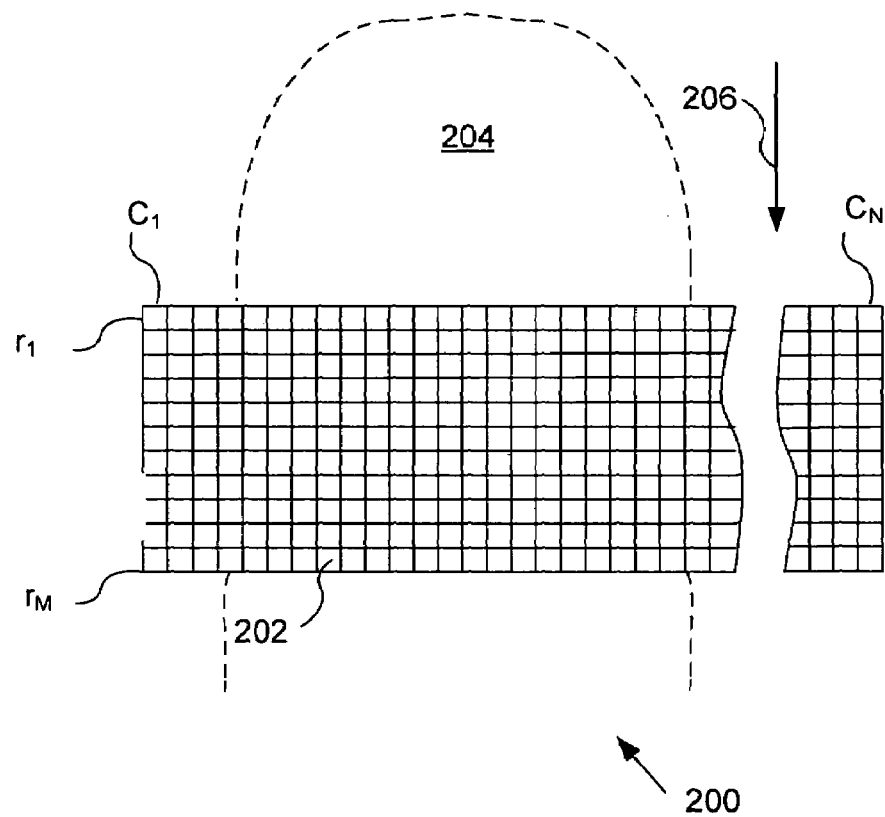
FIG. 2 illustrates an exemplary swipe fingerprint sensor in accordance with an embodiment of the present invention.

An exemplary swipe fingerprint sensor stripe 200, part of swipe sensor 106, is illustrated in FIG. 2. Swipe fingerprint sensor stripe 200 comprises an array of picture element ("pixel") capacitive sensors, such as pixel 202, that are arranged in a plurality of rows, illustrated in FIG. 2 as rows $r_1$ through $r_M$, and a plurality of columns, illustrated in FIG. 2 as columns $c_1$ through $c_N$. The intersection of each row and column defines the location of a pixel capacitive sensor.

Sensor stripe 200 may have any number of rows of pixels. FIG. 2 shows sensor 200 having 12 rows to illustrate the invention, but it is common for sensor element 200 to have between 12 and 36 pixel rows. Some embodiments use either 16 or 24 pixel rows. Likewise, sensor stripe 200 may have various numbers of pixel columns. In one illustrative embodiment, each row $r_N$ of sensor stripe 200 has 192 pixels. In other embodiments, sensor stripe 200 columns have 128 pixels if sensor stripe 200 has 16 or 24 rows. The number of columns is generally such that sensor stripe 200 is wider than finger 204, as shown by phantom line in FIG. 2, to be swiped across it. In some embodiments, however, the number of columns can be lessened such that sensor stripe 200 is somewhat narrower than a finger to be swiped across it, as long as sufficient fingerprint image data is captured for effective identification. (Fingerprint image core area is discussed in more detail below.) The number of pixels in each row and column will typically depend on various design parameters such as the desired resolution, data processing capability available to reassemble the fingerprint image frames, anticipated maximum digit swipe speed, and production cost constraints.

Arrow 206 shown in FIG. 2 illustrates a direction of finger 204 movement, as sensed by motion detector 108. Although FIG. 2 shows sensor stripe 200 oriented such that the pixel columns are generally parallel to the finger (e.g., the fingerprint image is reconstructed from bottom-to-top), in other embodiments sensor stripe 200 may be oriented such that the pixel columns are generally perpendicular to the finger (e.g., the fingerprint image is reconstructed from right-to-left).

Because the area of swipe sensor 106's sensor stripe 200 is less than the fingerprint area from which data is generated, fingerprint identification system 100 acquires at least two fingerprint image data frames as the finger is swiped across sensor stripe 200. Each fingerprint image frame represents a fraction of finger 204's fingerprint topology. To illustrate, in one case sensor element 200 is made of 24 rows, each row having 128 pixels. Each fingerprint image frame is therefore made of an array of 3,072 pixels. A plurality of fingerprint image frames is acquired as the finger is swiped across sensor stripe 200. Data buffer 112 has sufficient depth to store fingerprint image data frames between each data transfer to microprocessor module 102. In one embodiment, data buffer 112 includes a first buffer portion large enough to store only one row of 128 pixels. So that the next line of scanned image does not overwrite the currently stored image, a second buffer portion is needed to store the next line of image data while the first line is transferred to microprocessor module 102. This scheme is often referred to as double buffering. By rapidly sampling the analog signal generated by swipe sensor 106, two or more fingerprint image frames are captured.

As the finger is moved from top to bottom over sensor stripe 200, the initially captured fingerprint image frames represent a middle portion of the fingerprint and the last several frames represent the tip of the fingerprint. In other embodiments swipe sensor 106 is positioned to accept digit swipes from right to left, left to right, bottom to top, or in various other directional orientations, depending on how swipe sensor 106 is physically positioned or on a desired design feature. In some instances, a combination of swipe directions may be used during enrollment or identifications.

During operation, finger 204 is swiped across sensor stripe 200 in the direction of arrow 206. When finger motion detector 108 detects the presence of finger 204, the capacitive pixels of sensor 200 are rapidly sampled, thereby generating fingerprint image frames of the complete fingerprint. In one illustrative embodiment, more than one hundred frames are captured from the time finger 204 first contacts sensor stripe 200 until finger 204 is no longer in contact with sensor stripe 200. In one illustrative embodiment, system 100 accepts finger movement speed as fast as 20 centimeters per second. It will be appreciated that the number of generated fingerprint image frames will vary depending on how fast the finger is swiped and the length of the finger. It will also be appreciated that the swipe rate may vary during the swipe. For example, if the swipe is paused for a fraction of a second, many frames may contain identical or nearly identical data.

The acquired fingerprint image frames are assembled to form a complete fingerprint image. The sample rate is fast enough to ensure that the fingerprint image is over-sampled during a swipe. Such over-sampling ensures that a portion of one fingerprint image frame contains information identical to that in a portion of the next subsequent fingerprint image frame. This matching data is used to align and reassemble the fingerprint image frames into a complete fingerprint image. In one illustrative embodiment microprocessor module 102 assembles the fingerprint image frames in real time, such that only the most recent two sampled fingerprint image frames are required to be stored in host memory 116. In this embodiment, slow finger swipe speed will not tax system memory resources. In another illustrative embodiment, microprocessor module 102 receives and stores all captured fingerprint image data frames before assembling them into a complete fingerprint image.

Fingerprint image reconstruction is done in some embodiments by using a process based on three image data frames represented as matrices. As described above, swipe sensor stripe 200 illustratively has M rows and N columns of pixels 202.

Each of the three image data frames is associated with sensor stripe 200's pixel matrix dimensions of M rows and N columns. The following description is based on a fingerprint image data frame of 12 rows and 192 columns (i.e., 2304 pixels), a matrix size that is illustrative of various matrix sizes within the scope of the invention. The reconstructed fingerprint image will have the same width (e.g., 192 pixels) as the fingerprint image data frame.

The first fingerprint image frame that is used for fingerprint image reconstruction is the most recent fingerprint image frame $F_k$ (the "prior frame") from which rows have been added to the reconstructed fingerprint image. The second fingerprint image frame that is used is the next fingerprint image frame $F_{k+1}$ (the "next frame") from which rows will be added to the reconstructed fingerprint image. During real or near real time processing, next frame $F_{k+1}$ is just received at microprocessor module 102 from sensor module 104 in time for processing. A copy of prior frame $F_k$ is held in memory (e.g., memory 116) until next frame $F_{k+1}$ is processed and becomes the new prior frame. The third fingerprint image frame is an M×N fingerprint image frame $\hat{F}_k$ (the "extracted frame") that is extracted from the reconstructed fingerprint image. The extracted frame $\hat{F}_k$ is made of the most recent M rows added to the reconstructed fingerprint image.

As a finger passes over sensor stripe 200, the sampled fingerprint image data frames will have overlapping data. By computing correlations between $F_k$ and $F_{k+1}$, and between $\hat{F}_k$ and $F_{k+1}$, microprocessor module 102 determines the number of new image data rows from $F_{k+1}$ to be added to the reconstructed fingerprint image buffer. The process continues until the final new image data rows are added from the last fingerprint image data frame received at microprocessor module 102 to the reconstructed fingerprint image.

In general, each line l of a fingerprint image frame $F_k$ may be represented in matrix notation as:

$$l_i = [p_1^i \; p_2^i \; \ldots \; p_{N-1}^i \; p_N^i] \qquad \text{Eq. 1}$$

where $p_j^i$ is the $j^{th}$ pixel in the $i^{th}$ line.

The $k^{th}$ frame may be represented in matrix notation in terms of line vectors as:

$$F_k = \begin{bmatrix} l_1^k \\ l_2^k \\ \vdots \\ l_{M-1}^k \\ l_M^k \end{bmatrix} \qquad \text{Eq. 2}$$

where $l_i^k$ represents the $i^{th}$ line in the $k^{th}$ data frame. The next frame $F_{k+1}$ is similarly represented.

The frame extracted from the reconstructed fingerprint image matrix I may be represented as:

$$\hat{F}_k = I(1:M,:) \qquad \text{Eq. 3}$$

where 1:M indicates that the most recently added M rows are extracted from the reconstructed fingerprint image matrix I, and the second ":" indicates that all of the N column elements are extracted.

Ideally, the information in $F_k$ and $\hat{F}_k$ is identical since both represent the same M rows of fingerprint image data. In practice, however, there are variations due to uneven finger swipe speeds, data transcription errors (noise), and other real world problems such as quantization error arising from non-integer movement and normalization error. A reassembly process in accordance with the present invention makes allowances for such real world difficulties.

FIGS. 3–6, considered together, illustrate embodiments of fingerprint image reassembly from the sampled fingerprint image frames. One portion of memory 116 acts as a received fingerprint image frame buffer that holds one or more sampled fingerprint image frame data sets received from sensor module 104. Another portion of memory 116 acts as a reconstructed image buffer that holds the complete fingerprint image data I as it is assembled by microprocessor module 102.

Figure 3:
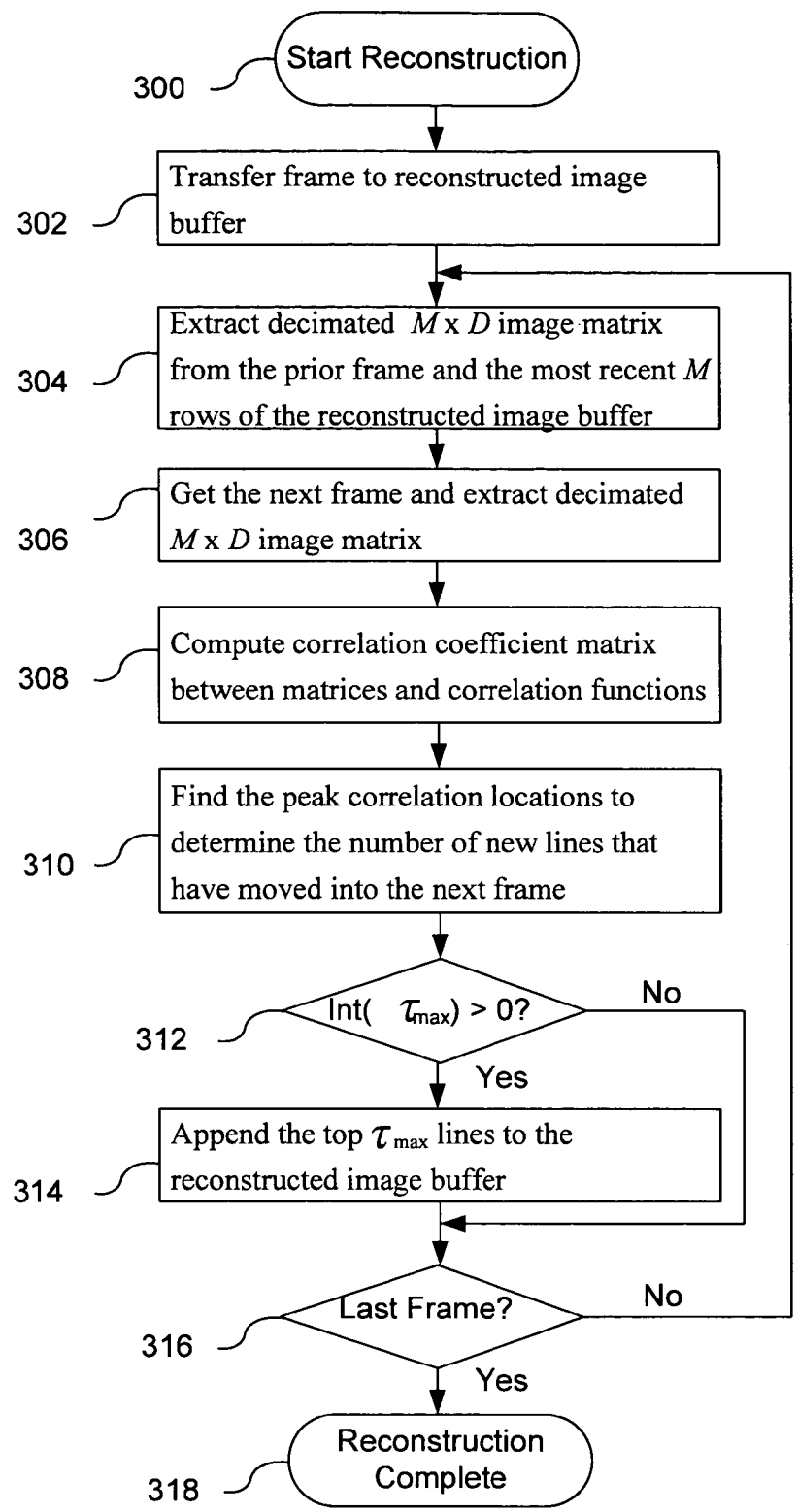
FIG. 3 shows one method for reconstructing a fingerprint image from a plurality of frames acquired from the swipe fingerprint sensor in accordance with an embodiment of the present invention.

As shown in FIG. 3, the fingerprint image reconstruction begins at 300 as the first sampled fingerprint image frame data $F_1$ is received into the fingerprint image frame buffer of memory 116. Since this is the first fingerprint image frame data, it can be transferred directly into the reconstructed image frame buffer as shown at 302. In other instances, the process described below can be used with values initialized to form a "prior" frame and in the reconstructed image frame buffer. At the conclusion of 302, at least M rows exist in the reconstructed fingerprint image buffer.

Figure 4:
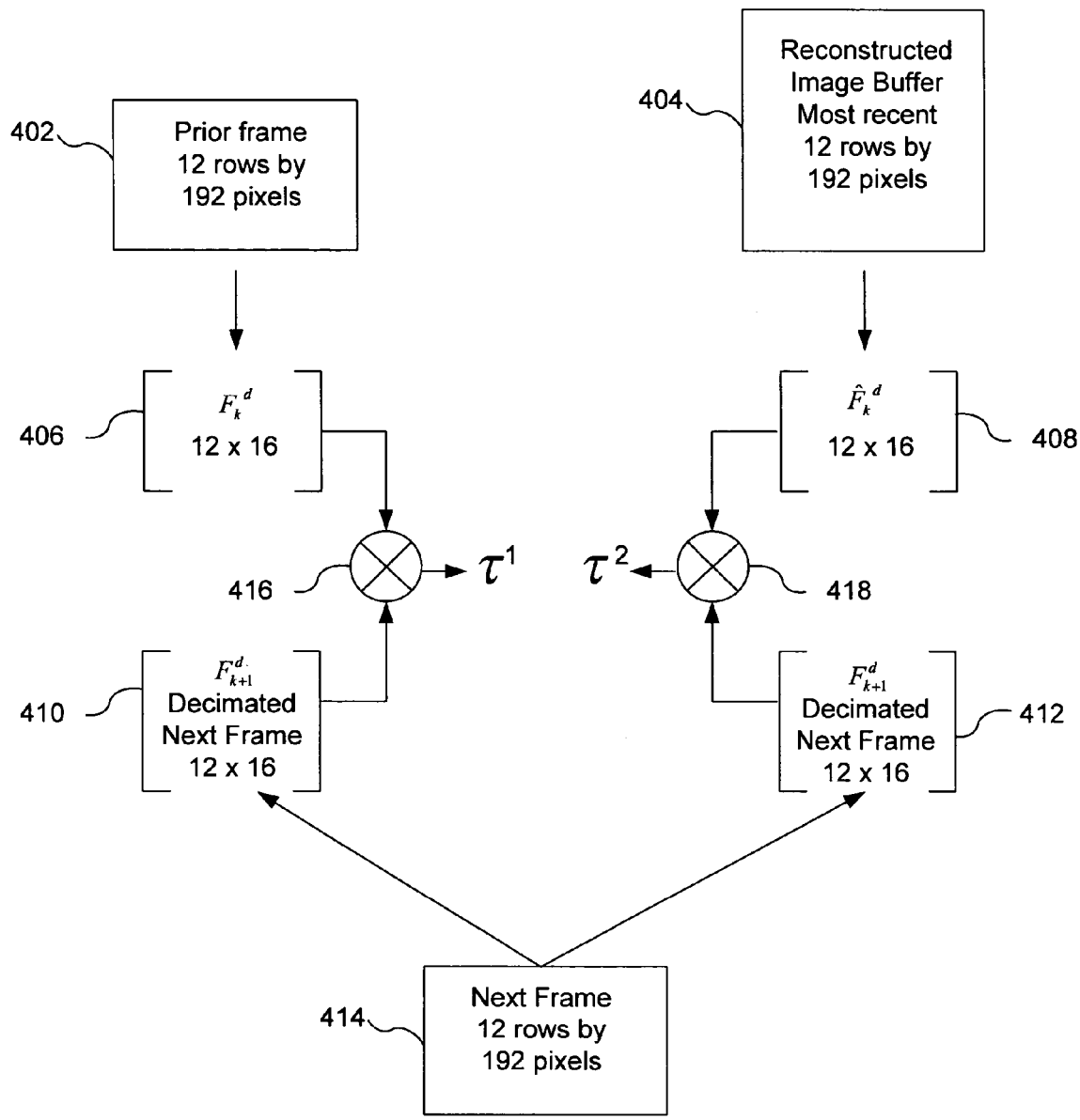
FIG. 4 illustrates the formation of the extracted arrays used to calculate the delay factor between frames in accordance with an embodiment of the present invention.

At 304, extracted frame $\hat{F}_k$ is created from data in the reconstructed fingerprint image buffer. Then, prior frame $F_k$ and extracted frame $\hat{F}_k$ are decimated to form two smaller matrices, represented as $F_k^d$ and $\hat{F}_k^d$, an operation that assists processing speed during calculations described below. This operation is diagrammatically illustrated in FIG. 4, which shows prior frame 402 and extracted frame 404 each decimated to form associated decimated prior frame 406 and decimated extracted frame 408. Referring again to FIG. 3, at 306 the next frame $F_{k+1}$ is received and decimated using a like manner and is represented as $F_{k+1}^d$. FIG. 4 illustrates next frame 414 decimated and shown in two instantiations as decimated next frames 410 and 412. The decimated arrays each comprise a M×D matrix where M equals the number of rows of sensor stripe 200 and D equals the decimated number of columns (or pixels per line). Decimating the matrices into D columns reduces the computation load on microprocessor module 102 by reducing the number of columns carried forward. For example, if the matrices each have 192 columns, the associated decimated matrices may each have, e.g., only 16 columns. Decimation should occur in real time to facilitate sensor use.

There are many possible decimation methods. For example, the frame may be decimated by looking at only the central 16 columns or by selecting the first column and every 10th or 12th column thereafter. In other illustrative embodiments, an average of a selected number of columns (e.g., ten) is used to form the decimated matrices, or the sum of every $$\frac{M}{16}$$

pixels is taken using a sliding window. Although these averaging processes requires slightly more computation than a non-averaging process, the averaging process is more robust and results in better compensation for non-linear or slanted finger swiping. The averaging operation functions as a low-pass filter in the horizontal direction such that the low-pass smoothing alleviates any change in signal characteristic due to horizontal shift created by a non-linear swipe. Decimation is not required, however, and in some instances when design considerations and data processing capability allows, the three matrices are processed in accordance with the invention without such decimation.

Referring again to FIG. 3, in 308, matrices $F_k^d$, $\hat{F}_k^d$, and $F_{k+1}^d$ are normalized. Then, one correlation coefficient matrix is calculated using normalized $F_k^d$ and $F_{k+1}^d$, and a second correlation coefficient matrix is calculated using normalized $\hat{F}_k^d$ and $F_{k+1}^d$. Next, two sets of correlation functions are computed by averaging the $\tau$ diagonal of the correlation coefficient matrices. These two sets of correlation functions correspond to the correlation between the new frame $F_{k+1}$ and the prior frame $F_k$, and the correlation between the new frame $F_{k+1}$ and the extracted frame $\hat{F}_k$.

FIG. 4 shows illustrative correlation engine 416 calculating a correlation coefficient matrix and correlation function $\tau^1$ from $F_k^d$ and $F_{k+1}^d$, and illustrative correlation engine 418 calculating a correlation coefficient matrix and correlation function $\tau^2$ from $\hat{F}_k^d$ and $F_{k+1}^d$. Correlation engines 416 and 418 then compute the delay (i.e., estimated finger motion between frames) between frame $F_k$ 402 and frame $F_{k+1}$ 414 to determine the number of rows from frame $F_{k+1}$ 414 that should be appended to the fingerprint image data stored in the reconstructed fingerprint image buffer. Although shown as separate elements to illustrate the invention, one skilled in the art will appreciate that a single correlation engine 416 may be utilized in practice. Similarly, although two copies of the decimated next frame $F_{k+1}$ 410 and 412 are illustrated, it will be appreciated that a single decimated next frame $F_{k+1}$ 410 may be correlated to both decimated frames 406 and 408. It will also be appreciated that arrays 406–412, as well as the correlation engines 416 and 418, are stored as data or as coded instructions in memory 116, and are either accessed as data or executed as instructions by execution unit 114.

Referring to FIG. 3, at 310 the peak correlation locations are found to determine how many lines in the new frame are to be moved into the reconstructed image matrix. In one embodiment, correlation is calculated using the following equations:

$$C_{k,k+1} = P_k F_k^d (F_{k+1}^d)^T P_{k+1} \qquad \text{Eq. 4}$$

and $$\hat{C}_{k,k+1} = \hat{P}_k \hat{F}_k^d (F_{k+1}^d)^T P_{k+1} \qquad \text{Eq. 5}$$

where T denotes a transpose matrix and $P \in \Re^{M \times M}$ is a diagonal matrix with the $i^{th}$ element being defined as:

$$\frac{1}{\sqrt{\sum (F^d(i,j))^2}} \qquad \text{Eq. 6}$$

and $\Re^{M \times M}$ denotes a real M×M vector space. In one embodiment, the P matrix is a 16 by 16 matrix that is used to normalize each row to uniform energy.

The resulting correlation functions $R(\tau)$ and $\hat{R}(\tau)$ in the Y direction are then calculated where $\tau$ will vary from zero to M−1. These functions are obtained by averaging the $\tau$th diagonal of the correlation coefficient matrices $C_{k,k+1}$ and $\hat{C}_{k,k+1}$ and finding the peak correlation locations in accordance with the functions:

$$\tau_{max}^1 = argmax(R(\tau)) \qquad \text{Eq. 7}$$

and $$\tau_{max}^2 = argmax(\hat{R}(\tau)) \qquad \text{Eq. 8}$$

The motion or delay across the swipe sensor is then calculated by:

$$\tau_{max} = f(\tau_{max}^1, \tau_{max}^2) \qquad \text{Eq. 9}$$

where the function f( ) can be a function of the weighted average or the average of the arguments. The purpose of averaging the two delay estimates is to improve the overall estimation quality.

The variable $\tau_{max}$ indicates how many new lines have moved into the new frame. Accordingly, the top $\tau_{max}$ lines from the new frame $F_{k+1}$ are moved into the reconstructed image matrix (I) or:

$$I = \begin{bmatrix} F_k(1:\tau_{\max},:) \\ I \end{bmatrix} \quad \text{Eq. 10}$$

as shown at 314.

At 312 the delay factor, $\tau_{max}$, is converted to an integer and checked to determine whether it is greater than zero. If $\tau_{max}>0$, then the top Int($\tau_{max}$) rows of the next frame $F_{k+1}$ are appended to the most recently added fingerprint image data rows in the reconstructed image buffer as indicated at step 314. If $\tau_{max}=0$, then no rows of the next frame $F_{k+1}$ will be appended to the reconstructed image buffer because a zero reading indicates that there has been no movement of the finger between samples and process flow proceeds to 316. If the user moves the finger at a detectable rate, the Int($\tau_{max}$) value will be always smaller than number of rows M. It will appreciated that the delay factor $\tau$ can be considered an image delay or offset as a finger is moved over sensor stripe 200 during fingerprint image sampling.

If $F_{k+1}$ is the last fingerprint image frame sampled by sample module 104, then in 316 the fingerprint image reconstruction process terminates 318. If not, then the fingerprint image reconstruction process returns to 304. The fingerprint image frame $F_{k+1}$ that has been processed becomes the prior fingerprint image frame $F_k$ and the next new fingerprint image frame $F_{k+1}$ is processed, as described above, until the finger swipe is complete.

Figure 5:
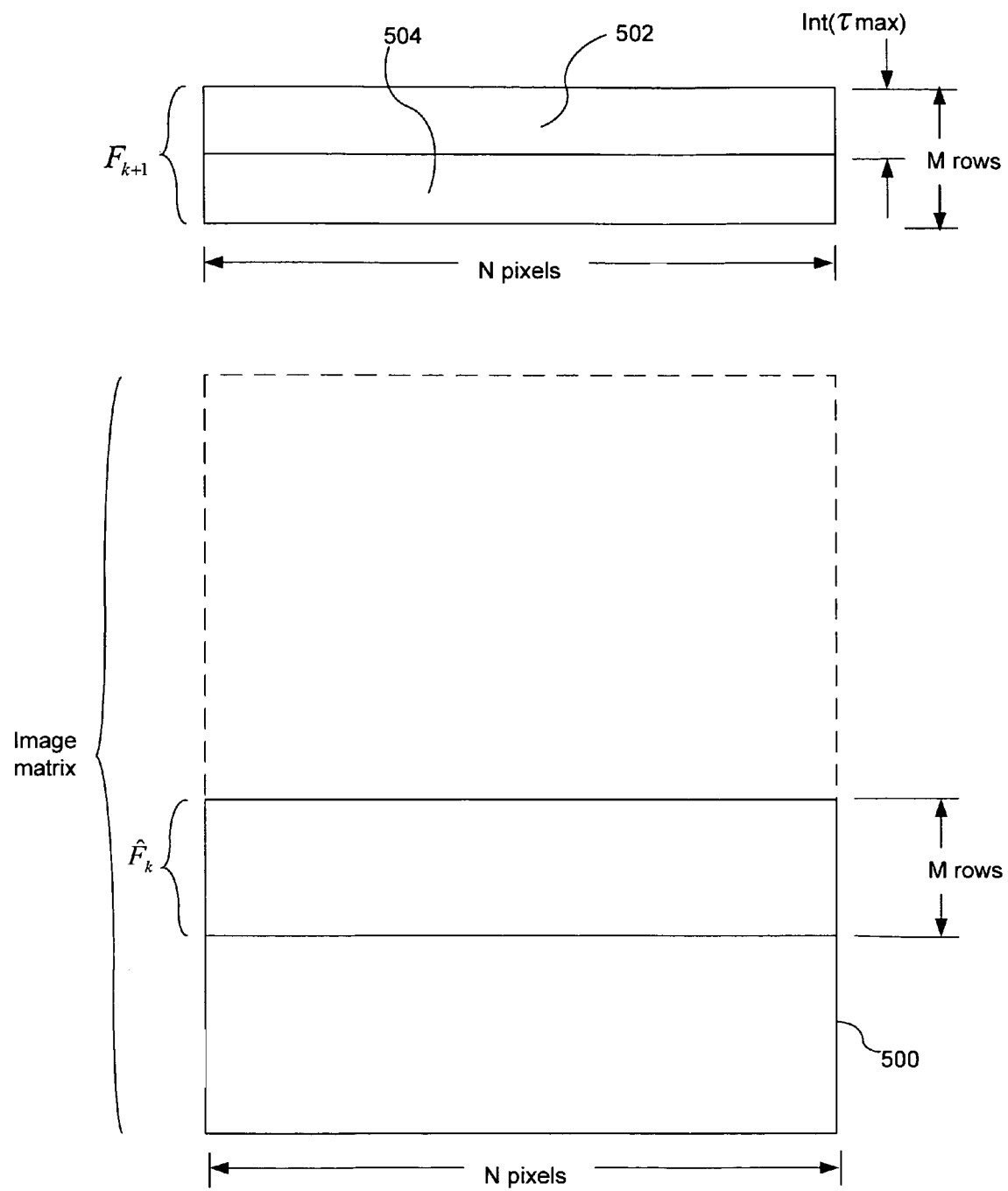
FIG. 5 shows an intermediate fingerprint image buffer and a current frame acquired from the swipe fingerprint sensor in accordance with an embodiment of the present invention.
Figure 6:
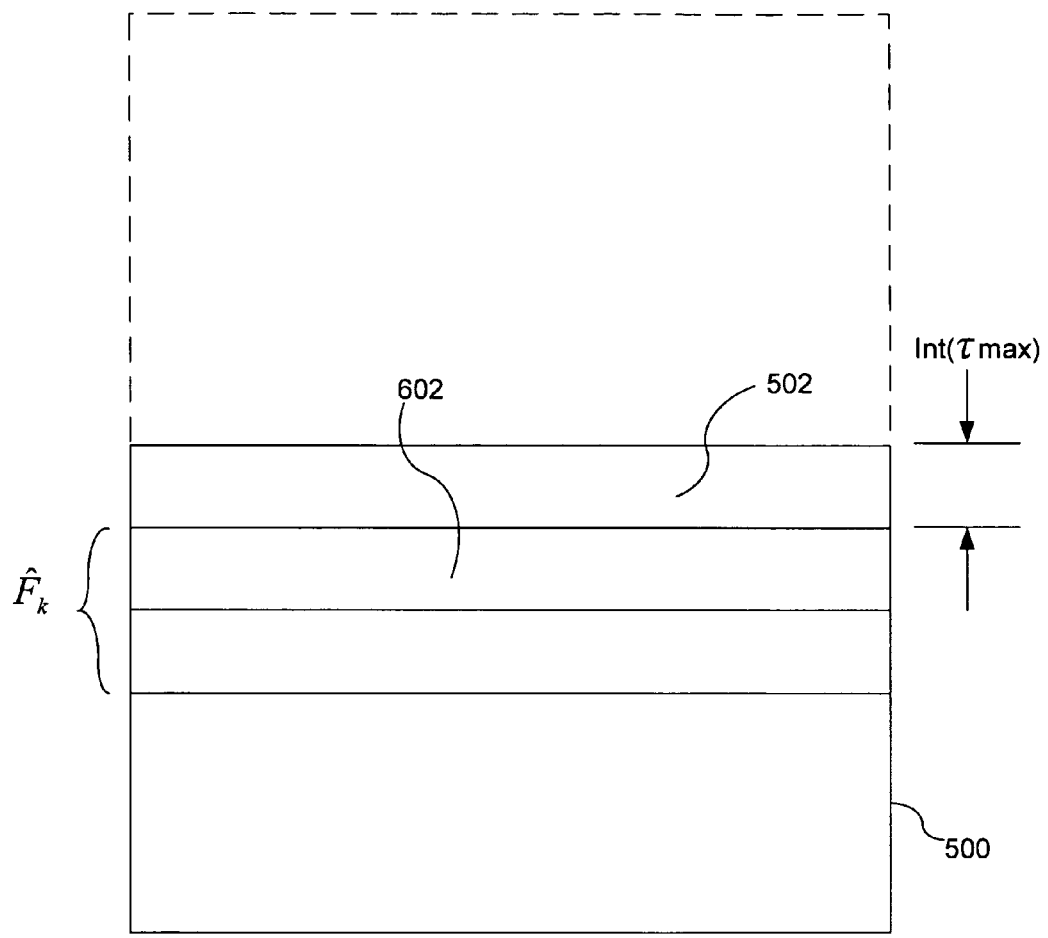
FIG. 6 shows an updated fingerprint image buffer in accordance with an embodiment of the present invention.

FIGS. 5 and 6 are diagrammatic views that further illustrate an embodiment of fingerprint image reconstruction as described above with reference to FIGS. 3 and 4. As shown in FIG. 5, M rows of the fingerprint image data most recently added to reconstructed fingerprint image buffer 500 (e.g., memory space in memory 116) are defined as extracted frame $\hat{F}_k$. Fingerprint image buffer 500 will eventually hold the complete reconstructed fingerprint image I. As shown in FIG. 5, the next fingerprint image frame $F_{k+1}$ also has M rows of image data. The top Int($\tau$) rows of next fingerprint image frame $F_{k+1}$ form new data portion 502. The remaining rows 504 of next fingerprint image frame $F_{k+1}$ generally match the top M−Int($\tau$) rows of extracted frame $\hat{F}_k$.

FIG. 6 shows that the top Int($\tau_{max}$) rows of next fingerprint image frame $F_{k+1}$ (that is, new portion 502) have been added to reconstructed fingerprint image buffer 500 as described above. There is a fingerprint image data overlap portion 602 of M−Int($\tau_{max}$), in which the fingerprint image data already stored in reconstructed fingerprint image buffer 500 is retained. New data portion 502 and data overlap portion 602 are then defined as the extracted frame $\hat{F}_k$ to be used during the next iteration of the fingerprint image reconstruction process described above. Once all of the frames have been integrated into reconstructed image buffer, a complete image I of the fingerprint of the finger swiped across the surface of sensor stripe 200 will be stored in the reconstructed fingerprint image buffer 500. This reconstructed fingerprint image I is then available for subsequent clean-up processing by execution unit 114 to, for example, remove noise or distortion. After such clean-up image processing (if any), microprocessor module 102 then proceeds to use the image I to form a fingerprint image template, if operating in the enrollment mode, or to compare the image I to the library of existing fingerprint image templates, if operating in the identification mode.

Figure 7:
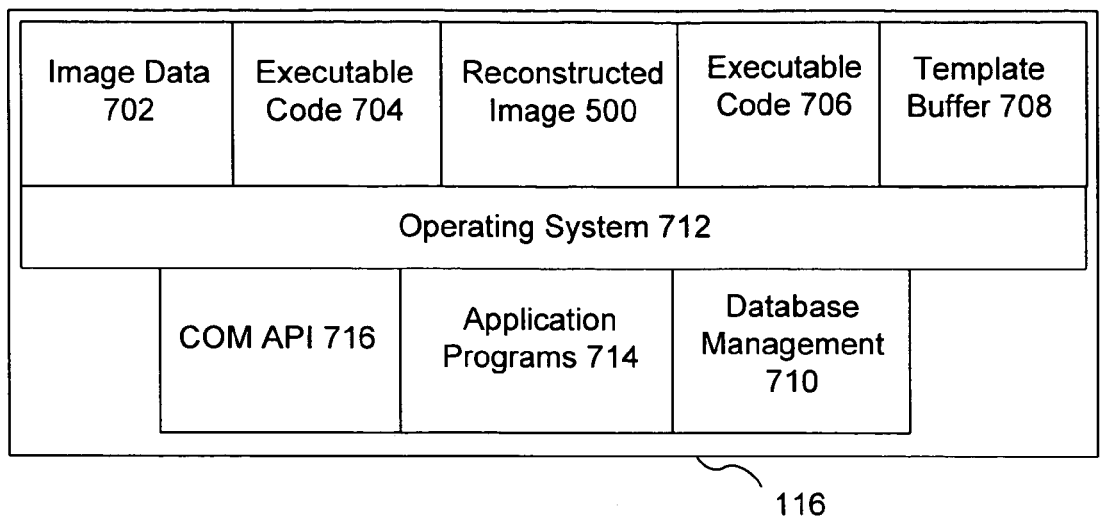
FIG. 7 illustrates an exemplary memory map showing the components for enrolling and identifying the fingerprints of a user in accordance with an embodiment of the present invention.

FIG. 7 illustrates a memory map 116 of one embodiment of the present invention. Fingerprint image frame data received from sensor module 104 is held in image data buffer 702. As the fingerprint image frame data is processed as described above, the reconstructed fingerprint image is stored in reconstructed fingerprint image buffer 500. Execution unit 114 uses executable code in memory space 704 to enroll a fingerprint for later identification use, and uses executable code in memory space 706 to determine if an acquired fingerprint image matches an enrolled image. Fingerprint image templates that are built during the enrollment process and that are used during the identification process are stored in fingerprint image template buffer 708. Database management system code required for database module 120, accessible by execution unit 114, is stored in memory space 710. In one instance the database management code is adapted for use as embedded code in the portable electronic device (e.g., cellular telephones, personal digital assistants, etc.) that hosts memory 116. Template buffer 708 memory space and/or memory space 710 may reside in, for example, host flash memory, an external memory card, or other high capacity data storage device or devices. As illustrated in FIG. 7, memory 116 may also contain operating system code in memory space 712 and one or more application programs in memory space 714 to control other peripheral devices (not shown) such as, by way of example, an access control system that restricts access to use of an electronic device or entry to a physical location. Application programs 714 may also include software commands that, when executed, control the user interface module 122 to inform and instruct the user. Once a user is enrolled, they may invoke an application program by merely swiping their finger over sensor 106. Communication module 118 code may reside in memory space 716 as an application program interface or in memory space 712 as part of operating system code. The memory map depicted in FIG. 7 is illustrative of various memory configurations distributed within or among various memory types.

Figure 8:
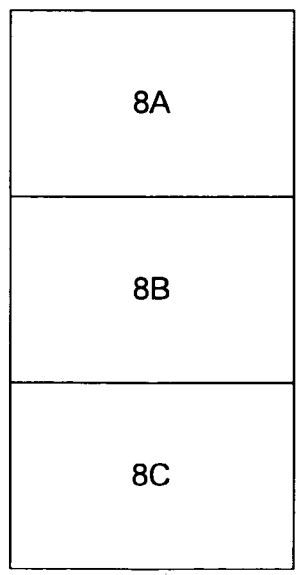
FIGS. 8 and 8A–8C show the enrollment mode of operation in accordance with an embodiment of the present invention.
Figure 8A:
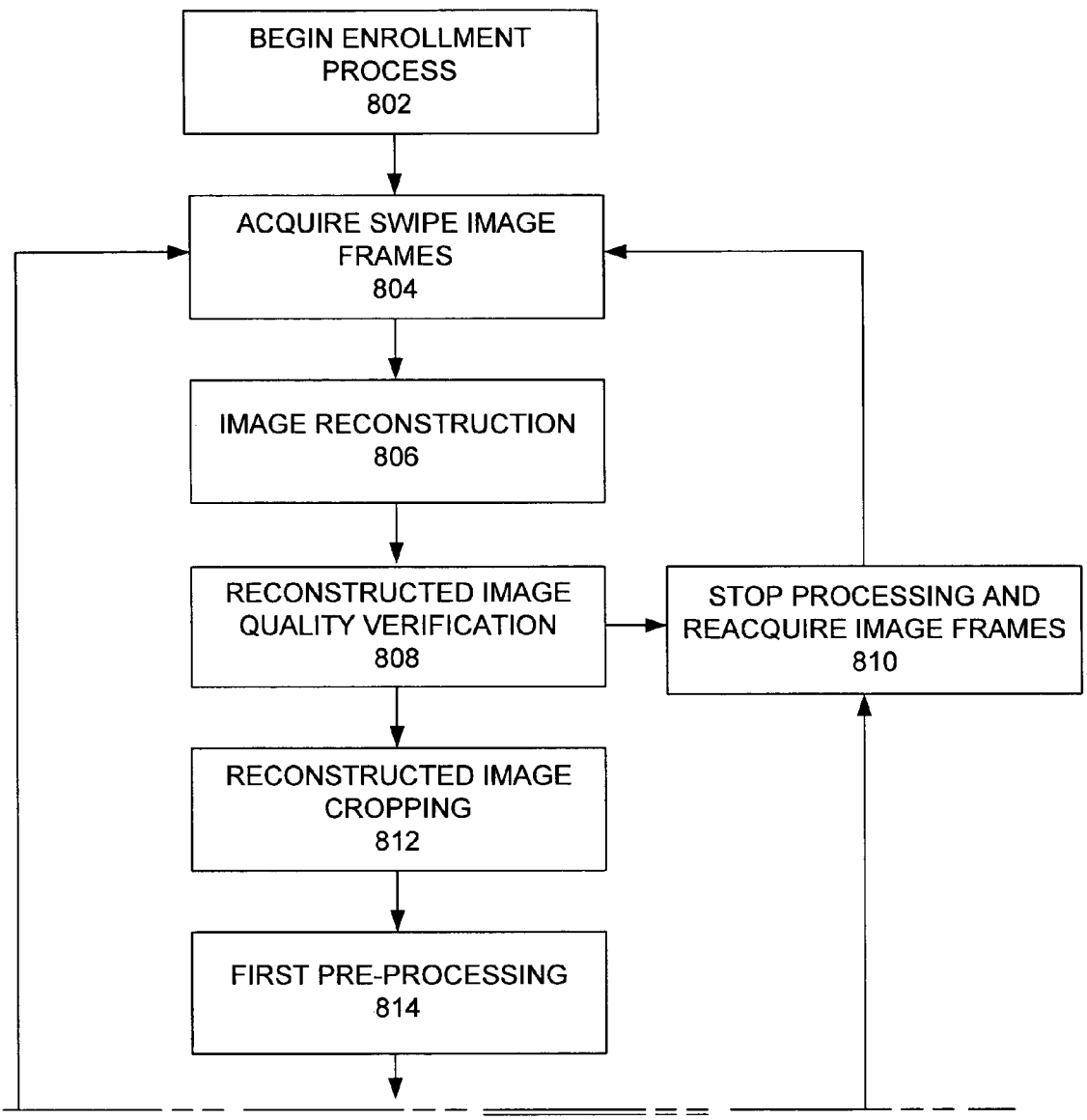
Figure 8B:
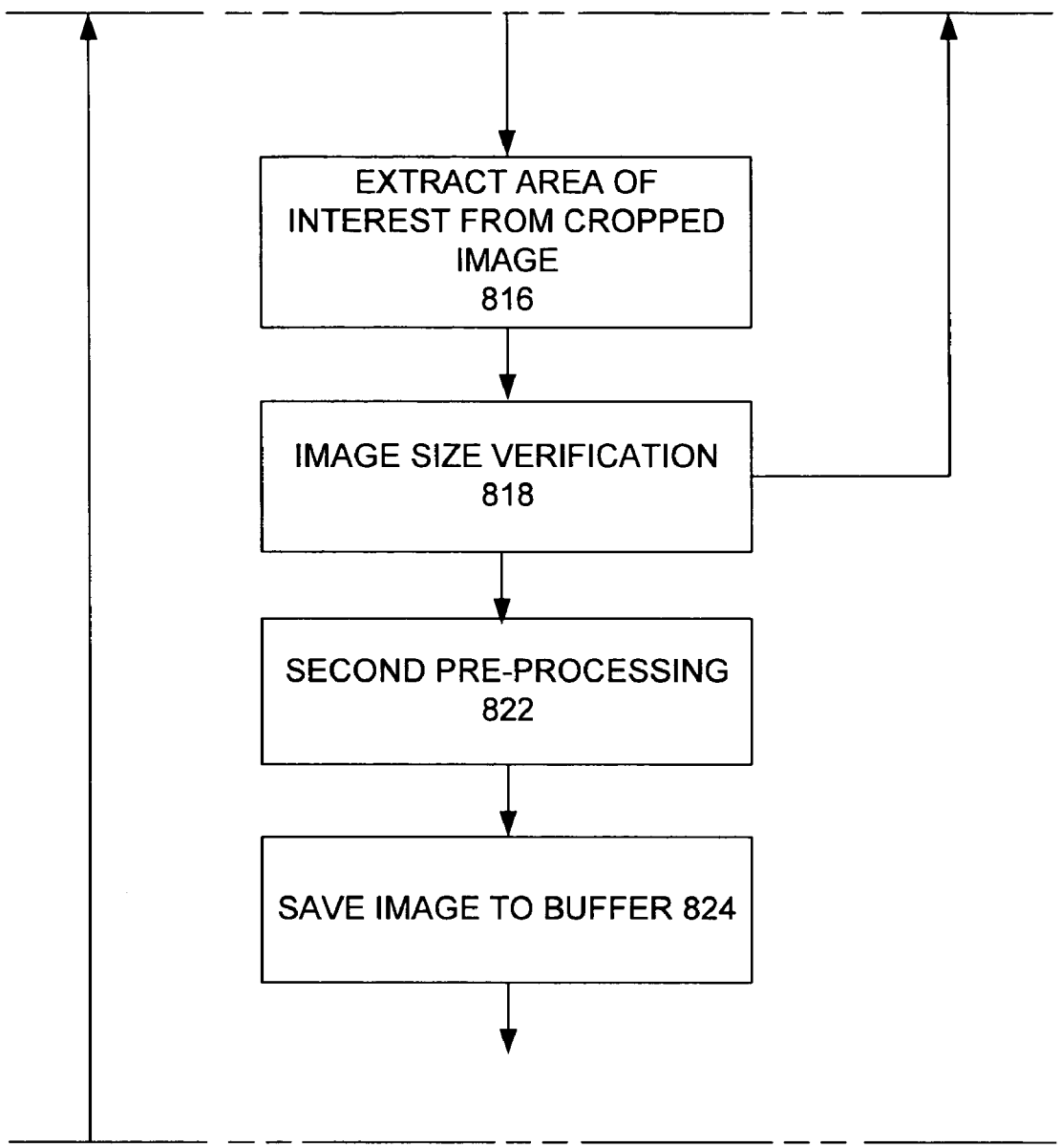
Figure 8C:
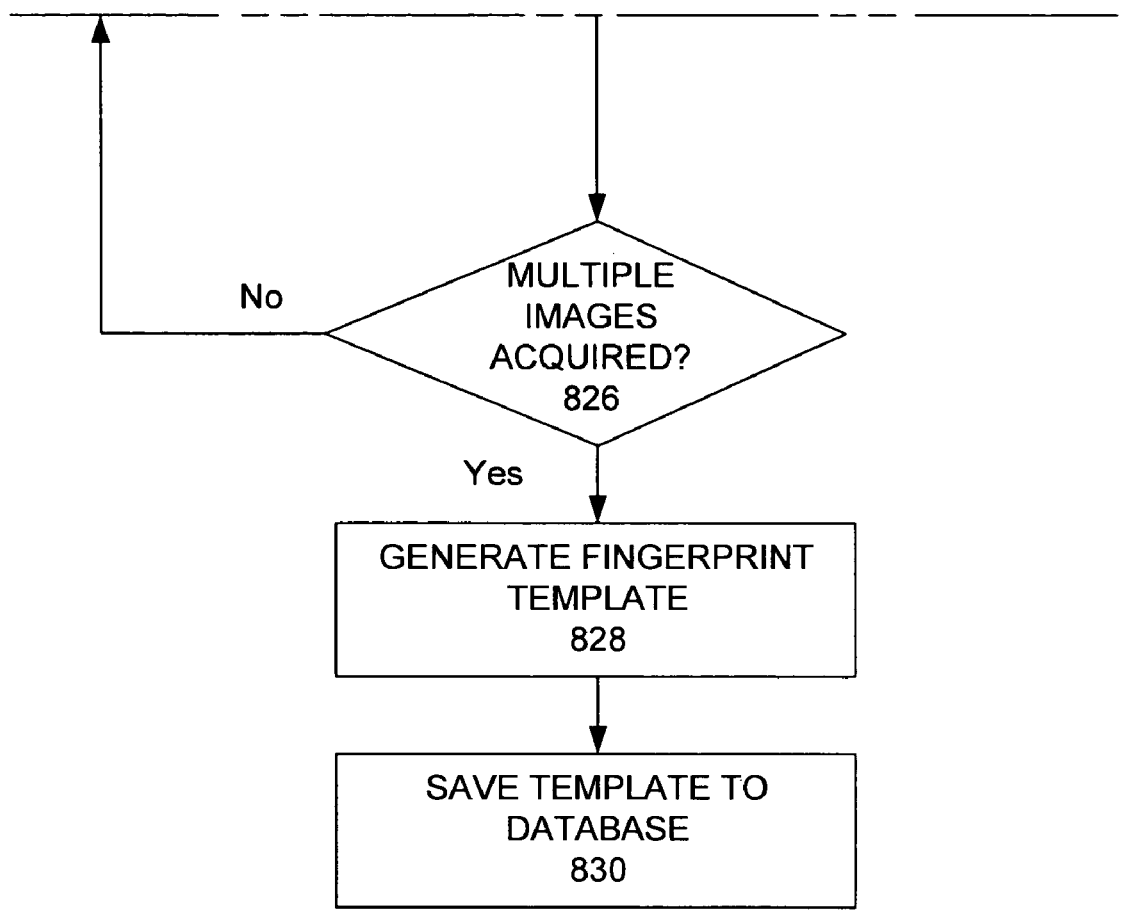

FIG. 8, assembled from FIGS. 8A–8C, is a flow diagram illustrating one embodiment of a method for acquiring a fingerprint in the enrollment mode for subsequent use in the identification mode. Each user to be identified is enrolled by acquiring one or more known fingerprint images and generating a template that will be managed by database management system, together with other identifying information associated with the enrolled user, and stored in fingerprint template buffer 708. During the enrollment process, multiple images centered around the fingerprint image core area are acquired and used to construct the fingerprint image template used in the identification mode. The number of acquired fingerprint images will vary depending upon the degree of accuracy required for a particular application. In some embodiments at least three fingerprint images are required to generate a fingerprint image template (in one instance four images are used). The enrollment process begins at 802 in FIG. 8A as user interface module 122 outputs an instruction to a user to swipe a finger across sensor stripe 200.

At 804, the fingerprint image frames acquired during the user's finger swipe are transferred to memory 116 as described above. Once the first two fingerprint image frames are in memory, the enrollment process initiates the execution of executable code 704. In one embodiment, only a few of the most recently acquired fingerprint image frames are saved in image data buffer 702. In another embodiment, only the two most recently acquired fingerprint image frames are saved. Once fingerprint image frames have been used to add data to the reconstructed fingerprint image they may be discarded.

At 806, executable code 704 begins to reconstruct the fingerprint image from the plurality of fingerprint image frames being received into memory 716. The fingerprint image reconstruction begins in real time and is primarily directed to detecting overlapping fingerprint image frame portions and adding non-overlapping portions as new data to the reconstructed fingerprint image, as described above.

Once the fingerprint image has been reconstructed, initial quality verification is performed at 808. The quality verification process applies a set of statistical rules to determine if the reconstructed image contains sufficient data and is capable of being further processed. In one embodiment, the image quality verification process uses a two-stage statistical pattern recognition. Pattern recognition is well known in the art and is an engineering selection that will depend on whether the application requires high accuracy or a fast analysis. In the first stage, a statistical database is generated from a collection of known good and bad images. The statistical features of the good and bad images are extracted and a statistical model is created for both good and bad populations. Although the statistical database is independently generated by each identification system in other embodiments, it may be preloaded into the identification system from an existing database structure. In the second stage, the same statistical features are extracted from the newly reconstructed fingerprint image and are compared to the good and bad statistical models. If the reconstructed fingerprint image has characteristics similar to those of a good image, enrollment continues. If the reconstructed fingerprint image has characteristics similar to those of a bad image, the image is considered to have unacceptable quality, the image is discarded, and the user is instructed to repeat the finger swipe as shown at 810.

At 812 the verified, reconstructed image is cropped. Image cropping accounts for, e.g., very long images with only a portion containing fingerprint data. It will be appreciated that passing a very large image to subsequent processing will consume system resources and result in decreased performance. Cropping strips off and discards non-core fingerprint and finger data. The cropped image will primarily contain data obtained from the core portion of the finger.

At 814 the cropped image is pre-processed, e.g., to remove noise components or to enhance image quality. For example, a 2-D low-pass filter can be used to remove high frequency noise, or a 2-D median filter can remove spike-like interference.

Referring to FIG. 8B, at 816 the core area of the cropped and pre-processed fingerprint image is identified because this area is generally accepted to be the most reliable for identification. Unlike the image generated by an area fingerprint sensor, the core area of the reconstructed fingerprint image cannot be guaranteed to be located in the neighborhood of the image center. Thus, the executable code scans the cropped fingerprint image to identify the core area. The core area typically exhibits one or more characteristic patterns that can be identified using methods such as orientation field analysis. Once the core area is located; the fingerprint image may be further cropped to eliminate non-essential portions of the image. The final cropped fingerprint image core area can be as small as a 64×64 pixel image.

At 818, a second quality verification is preformed to ensure that the cropped image of the core area is of sufficient size to enable identification. If the cropped image of the core area is too small, the image is discarded and another fingerprint image is acquired, as indicated at 812. Small images may occur due to very slow finger movement, during which only a small portion of the finger is scanned before scanning time-out. Small images may also occur if the swiped finger is off the center so that the cropped image contains only a small amount of useful data. One exemplary criterion for small image rejection states that if more than 20-percent of desired region around the core area is not captured, the image is rejected.

If, however, the cropped fingerprint image core area passes the quality control verification at 818, an optional second order pre-processing is performed at 822. This second pre-processing performs any necessary signal processing functions that may be required to generate a fingerprint image template. Since the cropped image of the fingerprint image core area is relatively small compared to the data captured by sensor 106, system resource requirements are significantly reduced. When pre-processing at 822 is completed, the image of the core region is stored in template buffer 710 as indicated at 824.

As indicated in FIG. 8C at 826, multiple fingerprint images are acquired. For each fingerprint image to be acquired, user interface module 122 outputs the appropriate instruction to the user. For example, the user may be instructed to swipe their right index finger (or, alternatively, any finger the user may choose) across the sensor, to repeat the swipe as necessary to obtain high quality multiple fingerprint images, and to be told that fingerprint image capture and enrollment has been successful. The fingerprint image acquisition loops between 804 and 826 until the specified number of fingerprint images has been acquired.

Once the multiple fingerprint images are acquired, a fingerprint image template is generated as indicated at 828. In one embodiment, a correlation filter technique is employed to form a composite of the multiple cropped fingerprint images. Multiple correlation filters may be used to construct a single fingerprint image template. An advantage of the correlation filter technique is that it requires a relatively small image size to get reliable identification performance. Use of the correlation filter technique on relatively small fingerprint image sizes during the enrollment and identification modes reduces system resource requirements over, for instance, area sensor requirements in which captured fingerprint images tend to be relatively larger.

Finally, at 830 the newly generated fingerprint image template and associated user identifying data are stored to a database.

Figure 9:
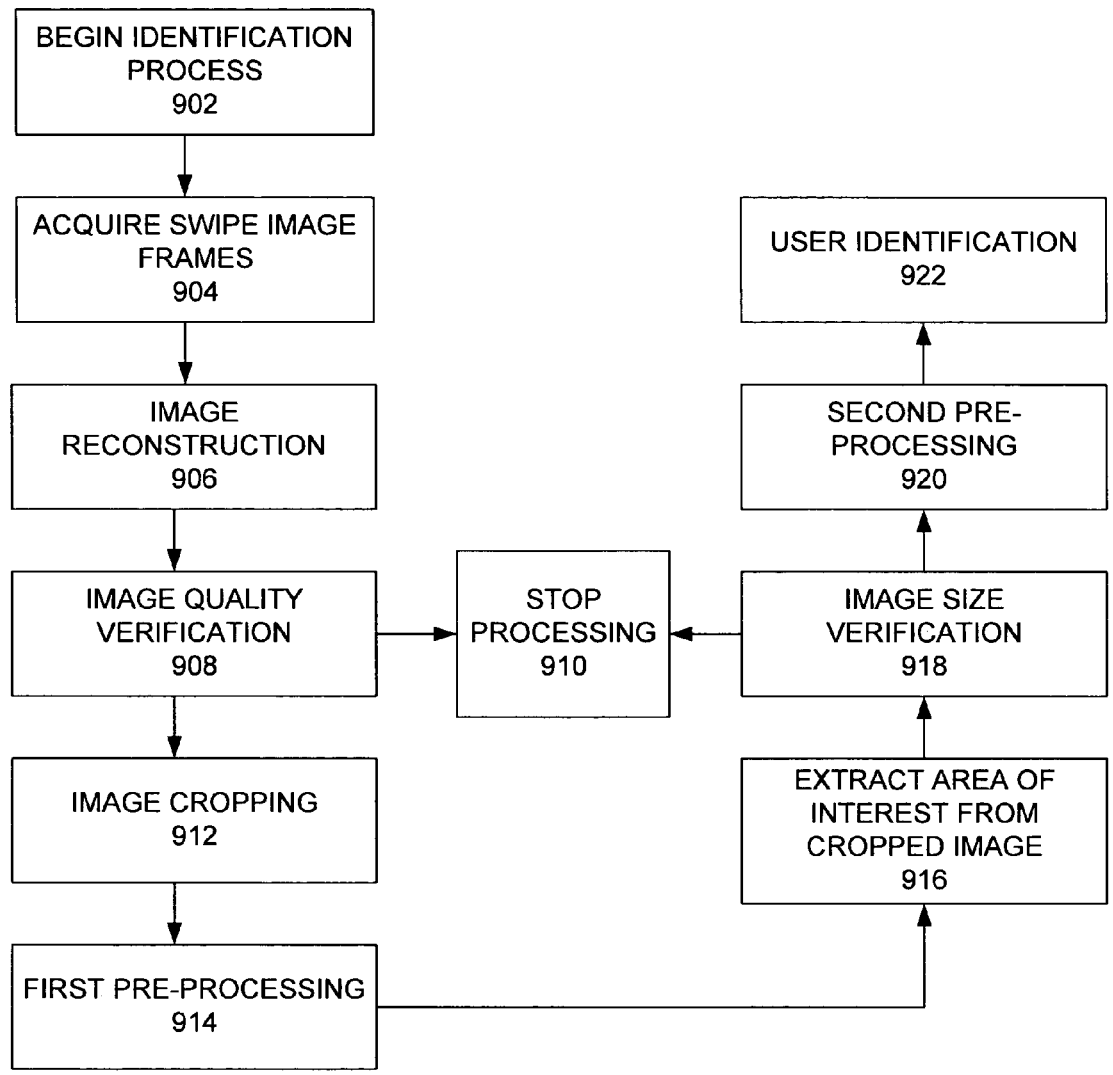
FIG. 9 shows the identification mode of operation in accordance with an embodiment of the present invention.

FIG. 9 is a flow diagram illustrating an embodiment of a process for the identification mode. If, for instance, motion detector 108 detects a finger, then the identification process begins if the enrollment mode has not been previously activated. The identification process begins at 902 with the acquisition of fingerprint image frames at 904 and reconstruction of the fingerprint image to be used for identification at 906 in accordance with the invention, as described above.

At 908 the fingerprint image quality is verified. If the fingerprint image is poor, the image data is dumped and processing stops at 910. Consequently, the user remains unidentified and an application program continues to, e.g., deny access to one or more device functions.

If the image quality is verified, at 912 the reconstructed fingerprint image is cropped to strip out peripheral fingerprint image data that does not include fingerprint image data to be used for identification. After cropping at 912, pre-processing at 914 removes, e.g., noise components, or other introduced artifacts and non-linearities.

At 916 the core area of interest of the acquired fingerprint image is extracted. At 918 the fingerprint image's extracted core area of interest image size is verified. If the image size has degraded, the process moves to 910 and further processing is stopped. If, however, the image size is verified as adequate, at 920 a second image pre-processing is undertaken, and the necessary signal processing functions are performed to condition the extracted, cropped fingerprint image in same manner as that used to generate fingerprint image templates, as described above.

At 922 a pattern matching algorithm is used to compare the extracted, cropped, and pre-processed fingerprint image with one or more stored fingerprint image templates. If a match is found (i.e., the core area of the fingerprint image acquired for identification is substantially similar to a stored fingerprint image template), the user who swiped his or finger is identified as being the one whose identification data is associated with the matching fingerprint image template. Consequently, an application program may, e.g., allow the identified user to access one or more device features, or to access an area. In one embodiment, a two-dimensional cross-correlation function between the extracted, cropped, pre-processed fingerprint image and the fingerprint image template is performed. If the comparison exceeds a pre-determined threshold, the two images are deemed to match. If a match is not found, the user who swiped his or her finger remains unidentified. Consequently, e.g., an application program continues to deny access to the unidentified user.

Various pattern matching methods may be used. For example, a correlation filter may be used with a peak-to-side lobe ratio (PSR) of a 2-D correlation function compared to a pre-specified threshold. If the PSR value is larger than the threshold, a match is declared. If the PSR value is smaller than the threshold, a mismatch is declared.

Fingerprint image processing and identification in accordance with the present invention allows sensor system 100 to be used in many applications, since such processing and identification are accurate, reliable, efficient, and inexpensive. Fingerprints are accepted as a reliable biometric way of identifying people. The present invention provides accurate fingerprint identification as illustrated by the various cropping, pre-processing, template generation, and image comparison processes described above. Further, system resource requirements (e.g., memory, microprocessor cycles) of the various embodiments of the present invention are relatively small. As a result, user enrollment and subsequent identification tasks are executed in real time and with small power consumption.

Figure 10:
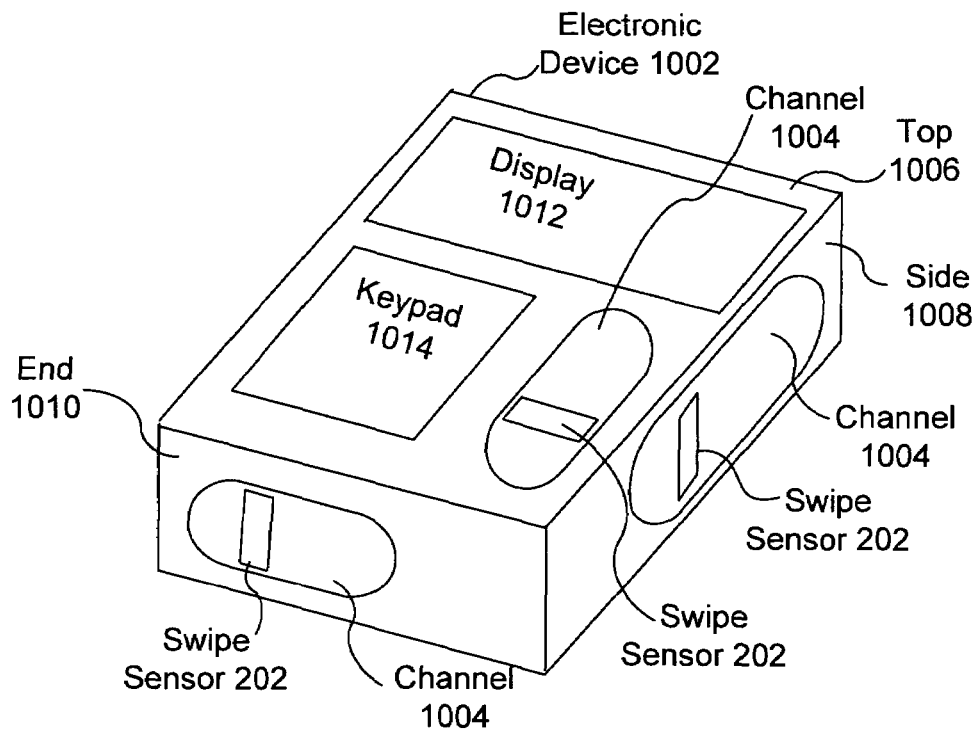
FIG. 10 is a diagrammatic perspective view of an illustrative electronic device that includes a fingerprint identification system in accordance with an embodiment of the present invention.

FIG. 10 is a diagrammatic perspective view of an illustrative electronic device 1002 in which fingerprint identification system 100 is installed. As illustrated in FIG. 10, electronic device 1002 is portable and fingerprint identification system 100 operates as a self-contained unit within electronic device 100. In other illustrative embodiments discussed below, electronic device and fingerprint identification system 100 are communicatively linked to one or more remote stations. Examples of portable electronic devices 100 include cellular telephone handsets, personal digital assistants (hand-held computer that enables personal information to be organized), laptop computers (e.g., VAIO manufactured by Sony Corporation), portable music players (e.g., WALKMAN devices manufactured by Sony Corporation), digital cameras, camcorders, and portable gaming consoles (e.g., PSP manufactured by Sony Corporation). Examples of fixed electronic devices 100 are given below in text associated with FIG. 11.

As shown in FIG. 10, sensor stripe 202 may be located in various positions on electronic device 1002. In some instances sensor stripe 202 is positioned in a shallow channel 1004 to assist the user in properly moving the finger over sensor stripe 202. FIG. 10 shows the channel 1004 and sensor stripe 202 combination variously positioned on top 1006, side 1008, or end 1010 of electronic device 1002. The channel 1004 and sensor stripe 202 is ergonomically positioned so as to allow the user to easily swipe his or her finger but to not interfere with device functions such as illustrative output display 1012 or illustrative keypad 1014. In some instances more than one sensor stripe 202 may be positioned on a single electronic device 1002 (e.g., to allow for convenient left- or right-hand operation, or to allow for simultaneous swipe of multiple fingers by one or more users).

Figure 11:
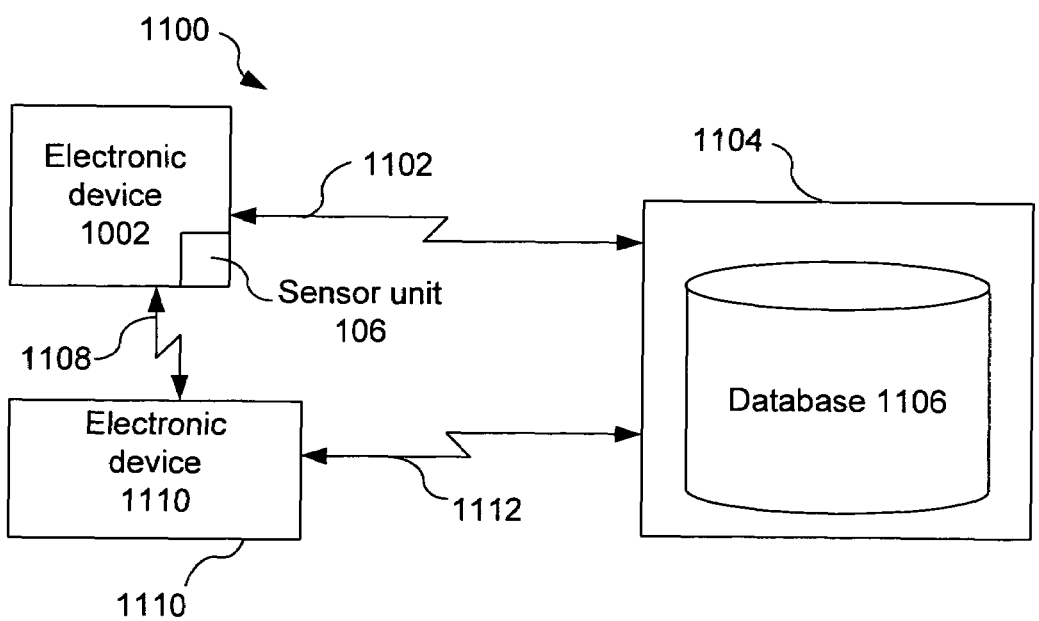
FIG. 11 is a diagrammatic view of an illustrative system that includes an electronic device having a swipe sensor and a computing platform remote from the electronic device for storing and identifying fingerprints in accordance with an embodiment of the present invention.

FIG. 11 is a diagrammatic view of an illustrative system 1100 that includes electronic device 1002, one or more devices or computing platforms remote from electronic device 1002 (collectively termed a "remote station"), and fingerprint identification system 100. In some instances, fingerprint identification system 100 is contained within electronic device 1002. In other instances, fingerprint identification system is distributed among two or more remote devices. For example, as shown in FIG. 11, electronic device 1002 communicates via link 1102 (e.g., wired, wireless) with remote station 1104. Remote station 1104 may include or perform one or more of the functions described above for microprocessor module 102. For instance, a large number of fingerprint image templates may be stored and managed by database 1106 in a nation-wide identification system (e.g., one in which multiple electronic devices 1002 access station 1104 to perform fingerprint identifications). FIG. 11 further illustrates embodiments in which electronic device 1002 communicates via communications link 1108 (e.g., wired, wireless) with a second electronic device 1110. In such embodiments remote station 1104 and the second electronic device 1110 may communicate directly via communications link 1112 (e.g., wired, wireless). In some instances, remote station 1104 is a computing platform in second electronic device 1110. Several examples illustrate such functions.

In one case, electronic device 1002 is fixed on a wall. A user swipes their finger over sensor unit 106 in electronic device 1002, and the fingerprint swipe information is sent via communications link 1102 to remote station 1104. Remote station 1104 receives the sampled fingerprint image frames, reconstructs and processes the fingerprint image, and then compares the user's fingerprint with fingerprint image templates stored in database 1106. If a match is found, remote station 1104 communicates with second electronic device 1110, either directly via communications link 1112 or indirectly via communications link 1102, electronic device 1002, and communications link 1108 so as to authorize second electronic device 1110 to open a door adjacent the wall on which electronic device 1002 is fixed.

In another case, a similar user identification function matches a user with a credit or other transactional card (e.g., FELICA manufactured by Sony Corporation) to facilitate a commercial transaction. Remote station 1104 compares card information input at second electronic device 1110 and a user fingerprint image input at electronic device 1002 to determine if the transaction is authorized.

Other illustrative applications include use of various fingerprint identification system 100 embodiments in law enforcement (e.g, police, department of motor vehicles), physical access control (e.g., building or airport security, vehicle access and operation), and data access control (e.g., commercial and non-commercial personal or financial records). Electronic device 1002 may be a peripheral device communicatively coupled with a personal computer (e.g., stand alone, or incorporated into a pointing device such as a mouse).

Although the invention has been described with respect to specific embodiments thereof, these embodiments are merely illustrative, and not restrictive of the invention.

The method described herein may be implemented in any suitable programming language can be used to implement the routines of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein "memory" for purposes of embodiments of the present invention may be any medium that can contain, store, communicate, propagate, or transport a program or data for use by or in connection with the instruction execution system, apparatus, system, or device. The memory can be, by way of example only but not by limitation, an electronic, magnetic, optical, electromagnetic, infrared, or semiconductor system, apparatus, system, device, propagation medium, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases such as "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention. Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

TABLE 3

| | | Density (lb/ft³) | Modulus (psi) | EI (lb-in²) | Rupture (psi) | Strain at Failure |
|---|---|---|---|---|---|---|
| Control (2-Box as solid section) | Average | 30.629 | 298686 | 233878 | 1570 | 0.010 |
| | Standard Deviation | 0.253 | 7184 | 2906 | 23 | 0.000 |
| | Coefficient of Variation | 0.8% | 2.4% | 1.2% | 1.5% | 3.2% |
| 20% Wood Foam Laminate | Average | 37.032 | 216064 | 179768 | 1304 | 0.011 |
| | Standard Deviation | 0.765 | 17962 | 13940 | 136 | 0.002 |
| | Coefficient of Variation | 2.1% | 8.3% | 7.8% | 10.4% | 20.3% |
| 20% Wood Foam Laminate - Other Side | Average | 37.032 | 154916 | 129661 | 1357 | 0.015 |
| | Standard Deviation | 0.765 | 18080 | 15581 | 58 | 0.000 |
| | Coefficient of Variation | 2.1% | 11.7% | 12.0% | 4.3% | 2.8% |
| 30% Wood Foam Laminate | Average | 36.987 | 255175 | 180068 | 1528 | 0.013 |
| | Standard Deviation | 1.887 | 33802 | 25113 | 147 | 0.001 |
| | Coefficient of Variation | 5.1% | 13.2% | 13.9% | 9.6% | 8.2% |

What is claimed is:

1. A method for acquiring and comparing biometric information, the method comprising:
   acquiring a plurality of frames of data representing a sampled output of a swipe fingerprint sensor, wherein said acquiring comprises determining a delay factor related to a detected finger motion;
   assembling said plurality of frames to form a fingerprint image, wherein said assembling comprises decimating at least one of said plurality of frames;
   verifying a quality of a core area of said fingerprint image by comparing a statistical feature of said fingerprint image to a statistical model, said statistical model being derived from a population of fingerprint images;
   if said assembled fingerprint image exhibits statistical features characteristic of sufficient quality, selecting a core portion of said fingerprint image having at least a portion of the core area of said fingerprint;
   comparing said core portion of said fingerprint image to a plurality of different templates, wherein each different template is formed from a composite of multiple cropped verified fingerprint images associated with a different person; and
   determining if said core portion of said fingerprint image matches a template.

2. A system comprising a portable electronic device, the system being configured to implement the method of claim 1.

3. A portable electronic device having a computer configured to implement the method of claim 1.

4. A computer-readable medium having instructions for implementation of the method of claim 1.

5. The method of claim 1, further comprising removing artifacts and noise from said fingerprint image before comparing and determining.

6. The method of claim 1, further comprising removing a portion of said fingerprint image, said removed portion comprising a portion of the non-core portion of said fingerprint image.

7. The method of claim 1, further comprising an enrollment mode for building a template.

8. The method of claim 7, wherein said enrollment mode comprises:
   acquiring a plurality of fingerprint images;
   cropping each of said plurality of fingerprint images;
   removing noise and artifacts from each of said cropped plurality of fingerprint images;
   extracting a core portion from each of said cropped plurality of fingerprint images;
   verifying a quality of said core portion of each of said cropped plurality of fingerprint images by comparing a statistical feature of each of said cropped plurality of fingerprint images to a statistical model;
   combining said core portion of said-cropped plurality of fingerprint images with a correlation filter to form a composite template; and
   saving said template to a database.

9. The method of claim 8, further comprising associating said template with information identifying a person.

10. A system comprising a portable electronic device, the system being configured to implement the method of claim 9.

11. A portable electronic device having a computer configured to implement the method of claim 9.

12. A computer-readable medium having instructions for implementation of the method of claim 9.

13. A fingerprint system, comprising:
   a microprocessor;
   a machine readable storage medium including instructions executable by the microprocessor for performing the following identification process:
      acquiring a plurality of frames of data representing a sampled output of a swipe fingerprint sensor, wherein said acquiring comprises determining a delay factor related to a detected finger motion;
      assembling said plurality of frames to form a fingerprint image, wherein said assembling comprises decimating at least one of said plurality of frames;

verifing a quality of a core area of said fingerprint image by comparing a statistical feature of said fingerprint image to a statistical model, said statistical model being derived from a population of fingerprint images;

if said assembled fingerprint image exhibits statistical features characteristic of sufficient quality, selecting a core portion of said fingerprint image having at least a portion of the core area of said fingerprint;

comparing said core portion of said fingerprint image to a plurality of different templates, wherein each different template is formed from a composite of multiple cropped verified fingerprint images associated with a different person; and determining if said core portion of said fingerprint image matches a template;

the fingerprint system further comprising a swipe fingerprint sensor module coupled to said microprocessor, said swipe fingerprint sensor module comprising:

a motion detector configured to detect a presence of a finger and a direction of a finger swipe;

a swipe sensor for generating a signal representing a fingerprint; and an image buffer configured to store frames of data derived from said signal.

14. The system of claim 13, wherein said image buffer is configured to store at least one line of image data obtained from said swipe sensor.

15. The system of claim 13, wherein said microprocessor executes a cropping process to limit image data to a portion of said fingerprint image when executing code to perform said identification process.

16. The system of claim 15, wherein said microprocessor filters said cropped image data when executing code to perform said identification process.

17. The system of claim 16, wherein said microprocessor conditions the extracted portion of said cropped image data when executing code to perform said identification process.

18. The system of claim 17, wherein said microprocessor, in a first instance, collects an area of interest for each of said fingerprint images when executing code to perform said identification process and, in a second instance, combines said collected areas of interests for each of said fingerprint images into a composite template.

19. The system of claim 18, wherein the area of interest of at least three fingerprint images are combined to form a template.

20. A method for authenticating a fingerprint images compnsing:

forming a fingerprint image from a plurality of frames of data representing a sampled output of a swipe fingerprint sensor, wherein said forming comprises:

determining a delay factor related to a detected finger motion; and decimating at least one of said plurality of frames;

verifying a quality of said fingerprint image by comparing a statistical feature of said fingerprint image to statistical models based on a population of both good and poor fingerprint images.

if said image exhibits statistical features characteristic of a good fingerprint image, then selecting a cropped portion of said fingerprint image that includes a core portion of said fingerprint image; and executing a pattern-matching algorithm to determine if said selected cropped portion of said fingerprint image matches a template from a plurality of different templates, wherein each different template is formed from a composite of multiple cropped verified fingerprint images associated with a different person.

21. The method of claim 20, wherein said pattern-matching algorithm executing step further comprises:

calculating a two-dimensional correlation function between said fingerprint image and said template;

calculating a peak-to-side lobe ratio (PSR) of said two-dimensional correlation function results; and comparing said PSR to a pre-specified threshold to determine if said fingerprint image matches said template.

22. The method of claim 21 further comprising generating said template from multiple cropped fingerprint core images generated from a plurality of images of a fingerprint during an enrollment process.

23. A system comprising a portable electronic device, the system being configured to implement the method of claim 21.

24. A portable electronic device having a computer configured to implement the method of claim 21.

25. A computer-readable medium having instructions for implementation of the method of claim 21.

* * * * *

UNITED STATES PATENT AND TRADEMARK OFFICE
CERTIFICATE OF CORRECTION

PATENT NO. : 7,212,658 B2
APPLICATION NO. : 10/927599
DATED : May 1, 2007
INVENTOR(S) : Du et al.

It is certified that error appears in the above-identified patent and that said Letters Patent is hereby corrected as shown below:

Column 1, Line 15, delete "FRINGER-" and add --FINGER--
Column 1, Line 18, add --co-pending-- after "following"
Column 1, Line 23, delete "FRINGERPRINT" and add --FINGERPRINT--
Column 9, Line 62, delete "$F_{k+1}{}^d$" and add --$F^d_{k+1}$--
Column 9, Line 63, delete "$F_{k+1}{}^d$" and add --$F^d_{k+1}$--
Column 9, Line 65, delete "$F_{k+1}{}^d$" and add --$F^d_{k+1}$--
Column 10, Line 6, delete "$F_{k+1}{}^d$" and add --$F^d_{k+1}$--
Column 10, Line 8, delete "$F_{k+1}{}^d$" and add --$F^d_{k+1}$--
Column 10, Line 30, delete "$F_{k+1}{}^d$" and add --$F^d_{k+1}$--
Column 10, Line 34, delete "$F_{k+1}{}^d$" and add --$F^d_{k+1}$--
Column 22, Line 1, delete "images" and add --image--
Column 22, Line 2, delete "compnsing:" and add --comprising--

Signed and Sealed this

First Day of January, 2008

JON W. DUDAS
*Director of the United States Patent and Trademark Office*